No. 654,041. Patented July 17, 1900.
H. WOLFF.
HOOF CLIPPER.
(Application filed Dec. 14, 1899.)
(No Model.)

Witnesses

Inventor
Henry Wolff
by H. B. Willson & Co.
Attorneys

UNITED STATES PATENT OFFICE.

HENRY WOLFF, OF GROVELAND, NEW YORK.

HOOF-CLIPPER.

SPECIFICATION forming part of Letters Patent No. 654,041, dated July 17, 1900.

Application filed December 14, 1899. Serial No. 740,371. (No model.)

*To all whom it may concern:*

Be it known that I, HENRY WOLFF, a citizen of the United States, residing at Groveland, in the county of Livingston and State of New York, have invented certain new and useful Improvements in Hoof-Clippers; and I do declare the following to be a full, clear, and exact description of the invention, such as will enable others skilled in the art to which it appertains to make and use the same.

The invention relates to hoof-clippers.

The object of the invention is to provide a device of this character which shall be simple of construction, durable in use, and comparatively inexpensive of production, and by means of which the hoof may be easily and quickly clipped in the act of trimming the same.

To this end the invention consists in certain features of construction and combination of parts, which will be hereinafter fully described and claimed.

Figure 1:
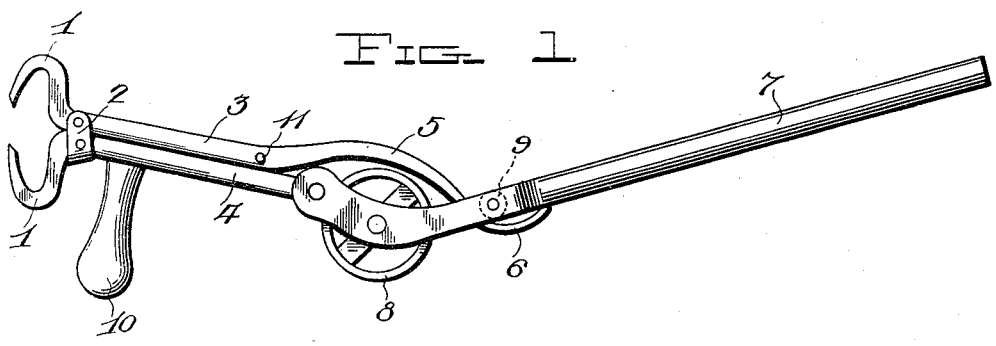
Figure 2:
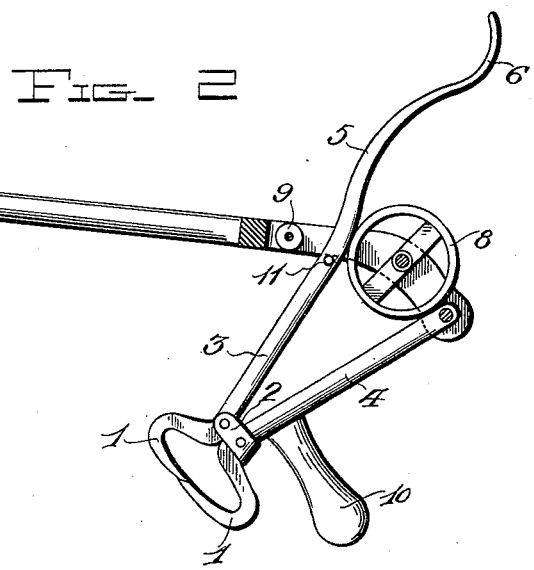

In the accompanying drawings, Figure 1 is a side elevation of my improved hoof-clipper, the clipping-jaws being shown open. Fig. 2 is a similar view with the clipping-jaws closed.

In the drawings, the same reference characters indicate the same parts of the invention.

1 denotes the clipping-jaws, which are hinged together by a strap 2 and which are provided with rearwardly-projecting shanks 3 and 4, which extend parallel for a distance of their length. The shank 3 is longer than the shank 4 and is provided with a curved offset 5 and a hooked end 6. 7 denotes an operating-lever, the forward end of which is bifurcated and is pivoted to the rear end of the shank 4. Journaled between the bifurcated members of the lever is a wheel 8, which is adapted to engage the curved offset 5 of the shank 3, the rear hooked end 6 of said offset projecting downward between the members of the lever 7 and bearing against a stop-roller 9.

10 denotes a handle fixed to the under side of the shank 4, and 11 denotes a stop-pin projecting laterally from the side of the shank 3.

In operation the handle 10 is grasped in the left hand and the lever 7 by the right. The jaws being in the position shown in Fig. 1 are now adjusted to the hoof. The free end of the lever 7 is now raised, and by reason of the wheel 8 engaging the curved offset 5 of the shank 3 the jaws 1 are forced together through the hoof. When the lever has reached the position shown in Fig. 2, its movement is stopped by the stop-pin 11, which indicates that the cutting-jaws have been forced through the hoof. The free end of the lever is now thrown back and its movement limited by the roller 9 coming in contact with the hook 6 of the shank 3.

From the foregoing description, taken in connection with the accompanying drawings, the construction, operation, and advantages of the device will be readily apparent without requiring an extended explanation.

My hoof-clipper is exceedingly simple, is easily and quickly operated, and is powerful in its action.

It will of course be understood that various changes in the form, proportion, and the minor details of construction may be resorted to without departing from the principle or sacrificing any of the advantages of the invention.

Having thus described the invention, what is claimed, and desired to be secured by Letters Patent, is—

1. A hoof-clipper comprising the pivoted clipping-jaws formed with shanks, one of said shanks being longer than the other, a lever pivoted to the shorter shank and provided with a wheel which is adapted to engage the longer shank and force the jaws together by the elevation of the lever, substantially as and for the purpose set forth.

2. A hoof-clipper comprising the pivoted jaws provided with shanks, one of which is longer than the other and is formed with a curved offset, a lever pivoted to the shorter shank and having a wheel adapted to engage the offset of the longer shank, and a handle fixed to the shorter shank, substantially as and for the purpose set forth.

3. A hoof-clipper comprising the pivoted cutting-jaws provided with shanks, one of which is longer than the other and is formed with a curved offset and a hook, a bifurcated lever pivoted to the shorter shank and straddling the hooked end of the other shank and formed with a stop-roller, a wheel journaled between the bifurcated members of said lever and adapted to engage the aforesaid curved offset of said shank, and a fixed handle secured to the shorter shank, substantially as and for the purpose set forth.

In testimony whereof I have hereunto set my hand in presence of two subscribing witnesses.

HENRY WOLFF.

Witnesses:
WM. JOHNSON,
W. A. SWEENEY.